(12) United States Patent  
Portilla Wanderley (10) Patent No.: US 11,270,086 B1  
(45) Date of Patent: Mar. 8, 2022

(54) SYSTEM AND METHOD FOR TRACKING OBJECTS

(71) Applicant: Chevron U.S.A. Inc., San Ramon, CA (US)

(72) Inventor: Sara Regina Portilla Wanderley, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/223,279

(22) Filed: Apr. 6, 2021

(51) Int. Cl.
| | |
|---|---|
| *H04W 24/00* | (2009.01) |
| *G06K 7/10* | (2006.01) |
| *G06K 19/07* | (2006.01) |
| *G08B 5/36* | (2006.01) |
| *H04B 17/318* | (2015.01) |
| *G08B 3/10* | (2006.01) |

(52) U.S. Cl.
CPC ..... *G06K 7/10099* (2013.01); *G06K 7/10386* (2013.01); *G06K 19/0723* (2013.01); *G08B 3/10* (2013.01); *G08B 5/36* (2013.01); *H04B 17/318* (2015.01)

(58) Field of Classification Search
CPC .......... G06K 7/10099; G06K 7/10386; G06K 19/0723; G08B 3/10; G08B 5/36; H04B 17/318
See application file for complete search history.

(56) References Cited

U.S. PATENT DOCUMENTS

| | | | | |
|---|---|---|---|---|
| 6,845,279 | B1* | 1/2005 | Gilmore | G05B 19/406 340/426.1 |
| 7,706,809 | B2* | 4/2010 | Sharony | G06K 17/00 455/456.1 |
| 2005/0000998 | A1* | 1/2005 | Grazioli | B25D 17/24 227/2 |
| 2010/0046586 | A1* | 2/2010 | McCorkle | H04B 1/7174 375/140 |
| 2010/0140345 | A1* | 6/2010 | Sakamoto | B25B 23/14 235/376 |
| 2013/0109375 | A1* | 5/2013 | Zeiler | H04W 12/126 455/426.1 |
| 2014/0025834 | A1* | 1/2014 | Mergener | H04L 67/16 709/230 |
| 2014/0107853 | A1* | 4/2014 | Ashinghurst | B25F 5/00 700/297 |

OTHER PUBLICATIONS

Chevron's Dropped Object Prevention Program, https://elcosh.org/document/3617/d001180/chevrons-dropped-object-prevention-program.html, Jan. 2010.

* cited by examiner

*Primary Examiner* — Munear T Akki  
(74) *Attorney, Agent, or Firm* — King & Spalding LLP (57) ABSTRACT

A computing system can include a radio transceiver and tracking manager software for tracking the location of objects such as tools. Radio frequency identification tags are attached to the objects and can communicate with the radio transceiver. During an initial registration process, the tracking manager software sends an initial registration signal to each object so that the object can be identified in a registered objects file. In one instance, the tracking manager software subsequently sends periodic interrogation signals to the objects to confirm that the objects are within a certain proximity. In another instance, after completing a task a worker can check-in each object wherein the tracking manager software sends interrogation signals to the objects to confirm that all of the objects are accounted for.

14 Claims, 5 Drawing Sheets

SYSTEM AND METHOD FOR TRACKING OBJECTS

TECHNICAL FIELD

Embodiments of the technology relate generally to using radio frequency identifying tags for tracking the proximity of objects.

BACKGROUND

Oil and gas extraction often involves workers performing work at substantial heights. As one example, oil and gas extraction typically requires rigs that support drilling and extraction equipment. The rigs are used for both on-shore and off-shore drilling and can range from 30 to 80 feet tall as measured from the base of the rig. The rigs can include many parts that require maintenance, repair and replacement, which is handled by workers who must ascend the rigs. The workers often bring tools or other equipment up into the rigs to perform tasks and one common risk involves workers forgetting the tools or other equipment up in the rig. An unsecured tool or piece of equipment left at a height in a rig poses a danger in that if the unsecured tool or piece of equipment falls from a substantial height it can injure people located below. Dropped objects striking workers is one of the more common types of injuries encountered on the oil and gas rigs. Similar risks can exist at other sites such as refineries where workers often perform work on structures at significant heights.

The Occupational Health and Safety Administration ("OSHA") of the U.S. Department of Labor sets certain safety standards to try to prevent the risks associated with dropped objects in work environments. For example, OSHA standard 1926.759 sets guidelines for protection from falling objects. To comply with safety guidelines and address the risk posed by falling objects in the oil and gas industry, various approaches to improving safety have been attempted. For example, prior approaches have used tethers attached to tools and holsters for securing tools. However, these prior approaches can be subject to human error, such as when workers are fatigued or distracted.

Accordingly, it would be advantageous to have a system that assists the worker in keeping track of tools and other equipment that are used in performing work at significant heights. Furthermore, it would be advantageous to have a system that prevents tools and other equipment from being forgotten on tall structures where they can pose a danger.

SUMMARY

The present disclosure is generally directed to an improved system and method for tracking objects. In one example embodiment, the present disclosure is directed to a computing system that communicates with radio frequency identification ("RFID") tags attached to tools. The computing system includes a display, a transceiver, memory storing computer-readable instructions, and one or more processors configured to execute the computer-readable instructions. The computer-readable instructions can be configured to transmit by the transceiver an initial registration signal to the RFID tag attached to the tool and receive a registration response signal from the RFID tag, wherein the registration response signal comprises a tool identifier. A tracking manager software application executing on the computing system can store the tool identifier in a registered tools file and can display the tool identifier on the display. After a predetermined time interval, the transceiver transmits an interrogation signal to the RFID tag attached to the tool and the tracking manager software application evaluates the type of the status response signal received from the RFID tag attached to the tool. If the tracking manager software application determines, based on the type of the status response signal, that the tool is beyond a perimeter distance from the computing system, the tracking manager will provide an alert.

In the foregoing example, the computing system can be a smart phone and the transceiver can be a radio frequency transceiver that attaches to the smart phone. The tool identifier that is received can include at least one of a tool name or a tool serial number. Furthermore, the alert the tracking manager provides can be at least one of an audible alert emitted by the computing system or a visible alert displayed on the display.

In the foregoing example, the one or more processors can be further configured to execute the computer-readable instructions to: determine, by the tracking manager, that the type of the status response signal is an absence of a response from the radio frequency tag of the tool; and provide, by the tracking manager, the alert from the computing system.

In the foregoing example, the one or more processors can be further configured to execute the computer-readable instructions to: determine, by the tracking manager, that a strength of the status response signal from the radio frequency tag of the tool fails to meet a threshold signal strength; in response to determining the strength of the status response signal from the radio frequency tag of the tool fails to meet the threshold signal strength, determine, by the tracking manager, that the tool is beyond the perimeter distance from the computing system; and provide, by the tracking manager, the alert from the computing system.

In the foregoing example, the one or more processors can be further configured to execute the computer-readable instructions to: determine, by the tracking manager, that a strength of the status response signal from the radio frequency tag of the tool meets a threshold signal strength; in response to determining the strength of the status response signal from the radio frequency tag of the tool meets the threshold signal strength, determine, by the tracking manager, that the tool is within the perimeter distance from the computing system; and provide, by the tracking manager, a notification via the computing system indicating the tool is secured.

In another example embodiment, the present disclosure is directed to a computing system that communicates with RFID tags attached to tools wherein the RFID tags contain a power source and can be referred to as active RFID tags. The computing system includes a display, a transceiver, memory storing computer-readable instructions, and one or more processors configured to execute the computer-readable instructions. The computer-readable instructions can be configured to transmit by the transceiver an initial registration signal to the RFID tag attached to the tool, the initial registration signal causing the RFID tag to change from an inactive state to an active state. In response, the transceiver receives a registration response signal from the RFID tag, wherein the registration response signal comprises a tool identifier. A tracking manager software application executing on the computing system can store the tool identifier in a registered tools file and can display the tool identifier on the display. The transceiver of the computing system can receive a periodic status signal from the RFID tag attached to the tool. The tracking manager can evaluate a strength of the periodic status signal and determine, based on the strength of the signal, that the tool is beyond a perimeter distance from the computing system, in which case the tracking manager provides an alert via the computing system.

In the foregoing example, the RFID tag can comprise an antenna, an integrated circuit, and a power source. The active state of the RFID tag can cause the RFID tag to emit the periodic status signal.

In the foregoing example, the one or more processors can be further configured to execute the computer-readable instructions to: store, by the tracking manager in memory, the strength of the periodic status signal for a plurality of periodic status signals; evaluate, by the tracking manager, a change in strength of the plurality of periodic status signals over time; and provide a second alert, by the tracking manager via the computing system, in response to the change in strength of the plurality of periodic status signals over time exceeding a threshold value.

In the foregoing example, the one or more processors can be further configured to determine, by the tracking manager, that the strength of the periodic status signal from the radio frequency tag of the tool meets a threshold signal strength; in response to determining the strength of the periodic status signal from the radio frequency tag of the tool meets the threshold signal strength, determine, by the tracking manager, that the tool is within the perimeter distance from the computing system; and provide, by the tracking manager, a notification via the computing system indicating the tool is secured.

In the foregoing example, the computing system can be a smart phone and the transceiver can be a radio frequency transceiver that attaches to the smart phone. The tool identifier that is received can include at least one of a tool name or a tool serial number. Furthermore, the alert the tracking manager provides can be at least one of an audible alert emitted by the computing system or a visible alert displayed on the display.

In yet another example embodiment, the present disclosure is directed to a computing system that communicates with RFID tags attached to tools for the purpose of registering and checking—in tools for tracking of the tools. The computing system includes a display, a transceiver, memory storing computer-readable instructions, and one or more processors configured to execute the computer-readable instructions. The computer-readable instructions can be configured to receive an initial login for a worker and transmit by the transceiver an initial registration signal to the RFID tag of the tool. The computing system can receive a registration response signal from the RFID tag wherein the registration response signal comprises a tool identifier. A tracking manager software application can store the tool identifier in a registered tools file and can display the tool identifier on the display. At a later point in time, the computing system can receive a subsequent login for the worker. The computing system can transmit by the transceiver an interrogation signal to the RFID tag of the tool and receive a response check-in signal comprising a check-in tool identifier. The tracking manager can store the check-in tool identifier in the registered tools file and provide an alert if the tool identifier in the registered tools file does not have a matching check-in identifier.

In the foregoing example, the computing system can be located in a vehicle. The tool identifier can comprise at least one of a tool name or a tool serial number. Furthermore, the alert the tracking manager provides can be at least one of an audible alert emitted by the computing system or a visible alert displayed on the display. In the foregoing example, the tracking manager can provide a cleared notification if the tool identifier in the registered tools file matches the check-in tool identifier.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of systems and methods for tracking objects and therefore are not to be considered limiting of the scope of this disclosure. The principles illustrated in the example embodiments of the drawings can be applied to alternate systems and methods for a tracking object. Additionally, the elements and features shown in the drawings are not necessarily to scale, emphasis instead being placed upon clearly illustrating the principles of the example embodiments. Certain dimensions or positions may be exaggerated to help visually convey such principles.

DETAILED DESCRIPTION OF EXAMPLE EMBODIMENTS

The example embodiments discussed herein are directed to methods and systems for tracking objects used at heights, such as on rigs used for drilling and extracting oil and gas. The example embodiments described herein can provide an improved approach to tracking objects used on rigs so that the objects are less likely to be misplaced or forgotten on the rig. As will be described further in the following examples, the methods and systems described herein improve upon prior art approaches to tracking objects used on rigs by reducing the opportunities for human error when working on a rig. The techniques described use RFID tags to track the location of objects and a computing system to provide alerts to a worker when an object is out of range or unaccounted for. The techniques described herein eliminate the complications caused by tethers and holsters in prior art approaches to tracking objects.

The terms "tool" and "object" are used herein to describe a variety of objects and equipment that a worker might use when working on a rig. Examples of tools or objects can include, but are not limited to, hammers, wrenches, gripping tools, welding tools, measuring devices, fasteners, helmets, and eyeglasses.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
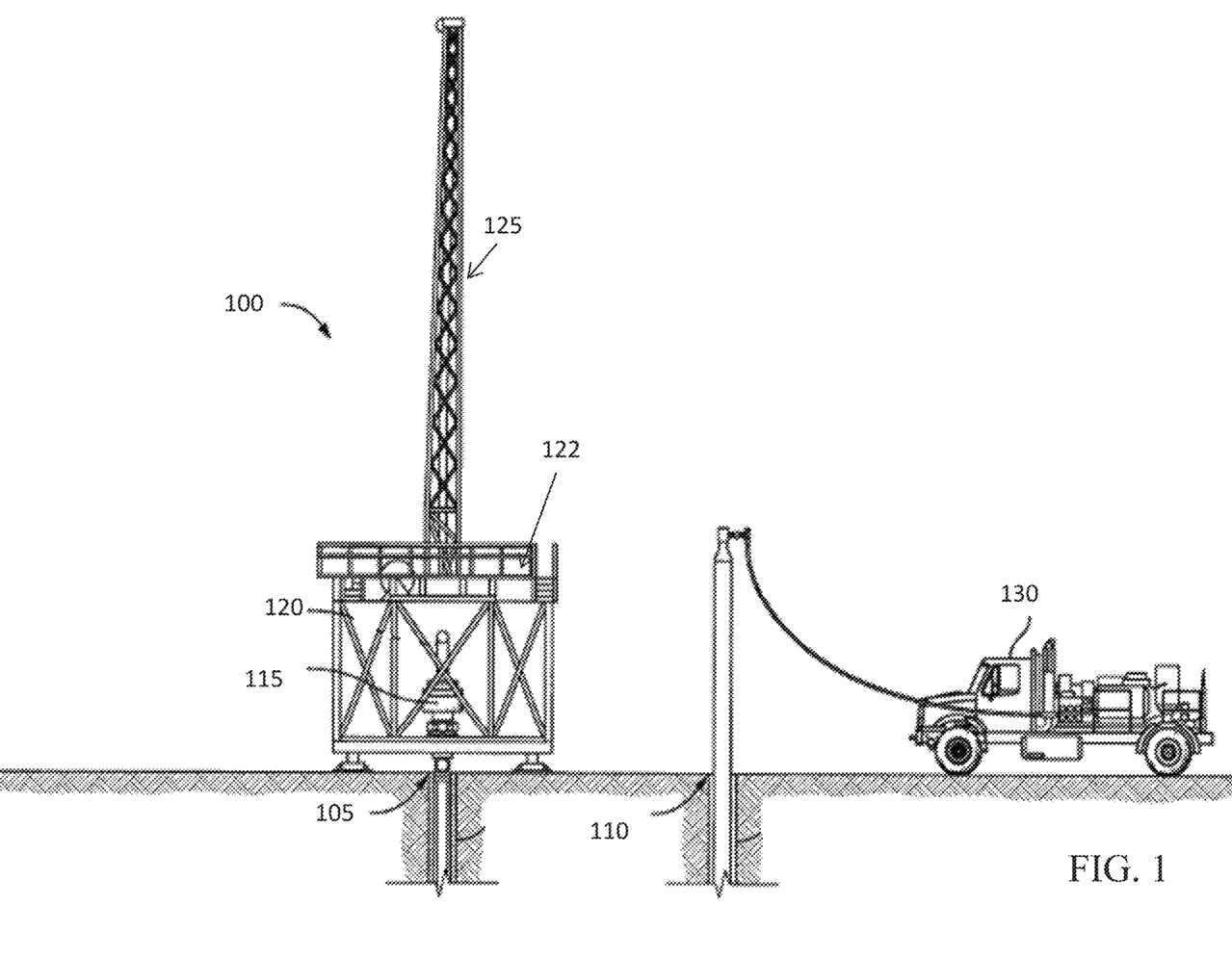
FIG. 1 illustrates an example rig used for drilling for hydrocarbons.

Referring to FIG. 1, an example of a rig used for extracting hydrocarbons is illustrated. As is typical of rigs in the oil and gas industry, the rig has considerable height and often times workers must ascend the rig to perform various tasks. As described previously, if an object or tool is forgotten on the rig, it can present a danger to people below if the object or tool falls from the rig. As also describes above, the presence of unsecured objects at heights has been recognized as a safety issue in the oil and gas industry as well as other industries and OSHA has established certain standards relating to reducing the likelihood of dropped objects.

In FIG. 1, an example drilling rig 100 is located on a pad that includes a first well 105 and a second well 110. The drilling rig 100 is disposed over the first well 105 and the wellhead 115 of the first well 105. The drilling rig 100 comprises a substructure 120, a drill floor 122, and a mast 125 extending vertically above the drill floor 122. The example well 100 shown in FIG. 1 includes a service truck 130 located at the site for performing work on the wells. As can be seen in FIG. 1, the height of the drilling rig 100 is several times higher than the height of the truck 130. Often times, workers will ascend the drilling rig 100 and the mast 125 to perform work and will bring tools or other equipment up into the rig 100 to perform the work. As explained previously, in some instances, workers can misplace or forget the tools or other equipment brought up into the rig 100 and the tools or other equipment are left behind at a height on the drilling rig 100. If such tools or equipment later fall from the drilling rig 100, they can present a hazard for people below. Accordingly, the following systems and methods described in connection with FIGS. 2-5 provide techniques for reducing the risk of tools or objects being left behind on the drilling rig where they can present a hazard. While an example of a drilling rig is provided in FIG. 1, it should be understood the techniques described herein can apply to any type of rig or tall structure where a worker has to ascend the structure with tools.

Figure 2:
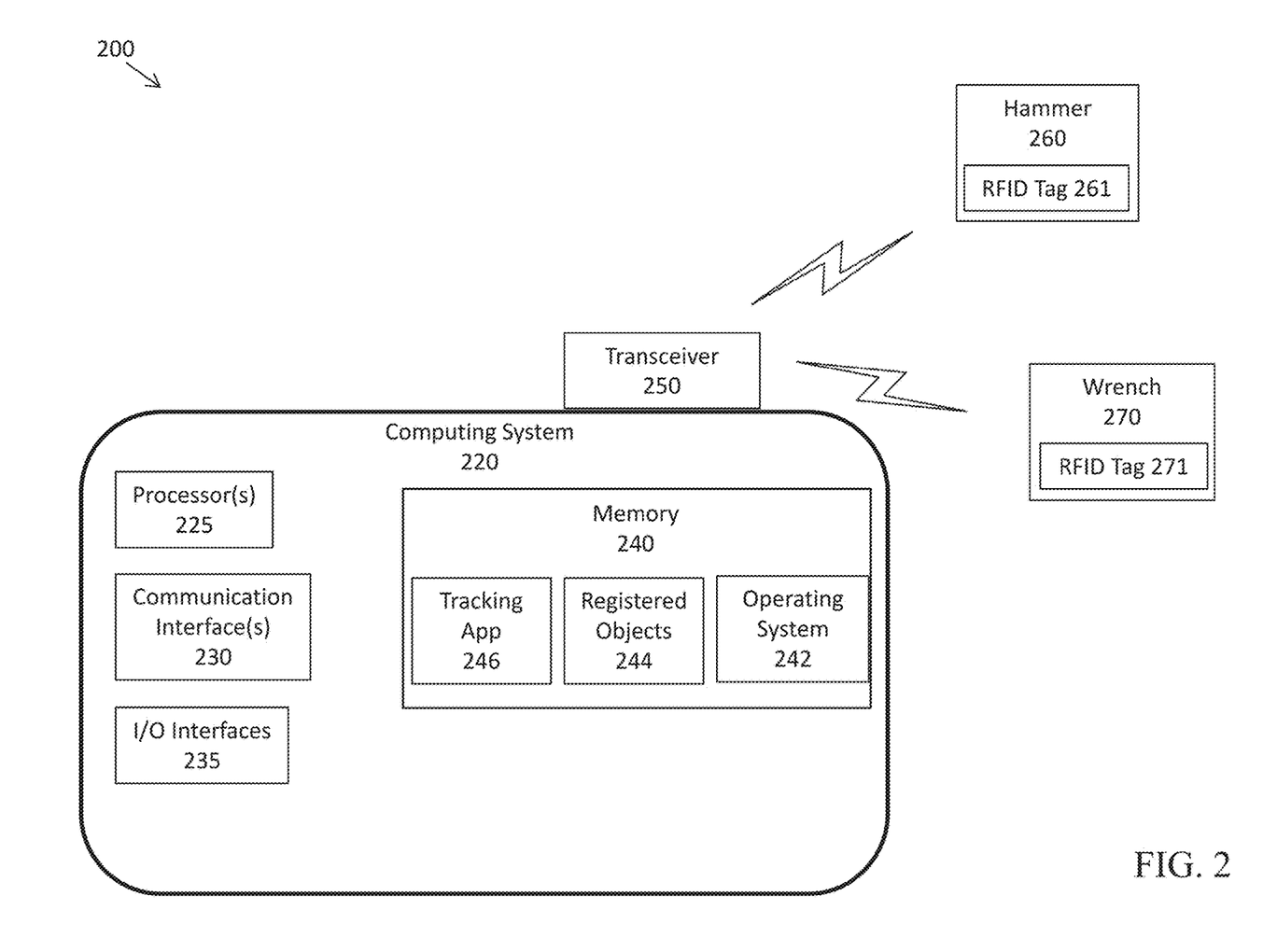
FIG. 2 is a schematic view of a system for tracking objects in accordance with an example embodiment of the present disclosure.
Figure 3:
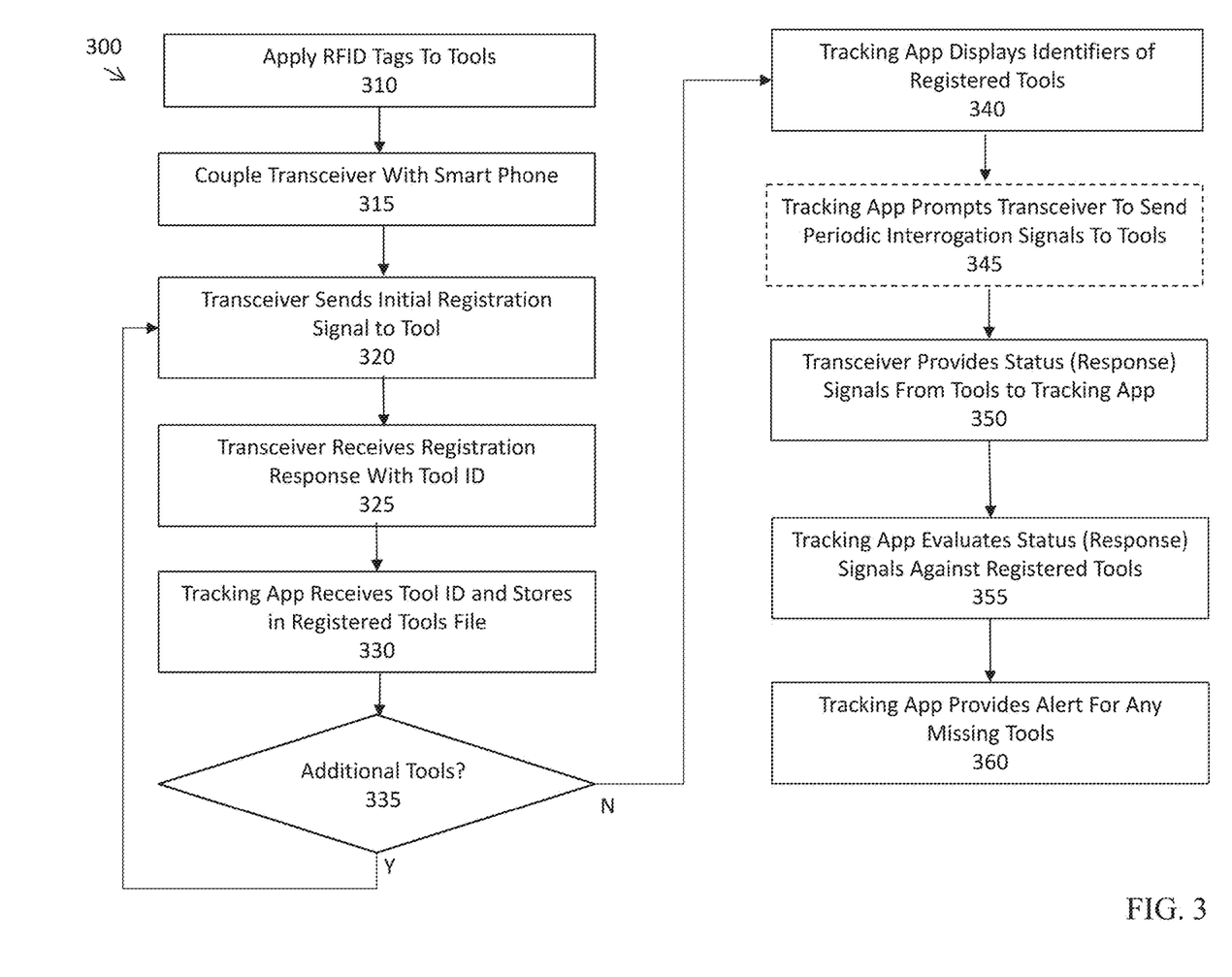
FIG. 3 illustrates a method for tracking objects using the system of FIG. 2 in accordance with an example embodiment of the present disclosure.

Referring now to FIGS. 2 and 3, an example system 200 and example method 300 are illustrated for tracking the location of tools or objects used in work on a rig. FIG. 2 shows an example computing system 220, such as a smart phone or other portable computing device that a worker can carry in a pocket or attach to a belt while performing work on a rig. The computing system 220 can include, but is not limited to, one or more processors 225, memory 240, a communications interface 230, and input/output components 235. A bus (not shown) can allow the various components of the computing system 220 to communicate with one another. A bus can be one or more of any of several types of bus structures, including a memory bus or memory controller, a peripheral bus, an accelerated graphics port, and a processor or local bus using any of a variety of bus architectures. The components shown in FIG. 3 are not exhaustive, and in some embodiments, one or more of the components shown in FIG. 3 may not be included in an example system. Further, one or more components shown in FIG. 3 can be rearranged.

The communications interface 230 can transmit and receive signals via signal transfer links, including but not limited to signals sent and received from a transceiver 250. In some example embodiments the transceiver can be integrated into the computing system 220, while in other embodiments the transceiver 250 can be a separate component that is coupled to the computing system 220. The transceiver can be a radio frequency transceiver that communicates at or about 8 MHz as is often used for communications with RFID tags. In some example embodiments, the communications interface 230 enables communications with other wireless computing devices.

In one or more example embodiments, the one or more processors 225 execute software instructions stored in memory 240. The memory 240 includes one or more cache memories, main memory, and/or any other suitable type of memory. The memory 240 can be a persistent storage device (or set of devices) that stores software and data used in the operation of the computing system 220. As illustrated in the example of FIG. 2, the memory 240 can store an operating system 242, a tracking manager software application 246, and data, which can include identifiers of registered objects or tools. It should be understood that memory 240 can also store other software algorithms and data. For example, data associated with signals received from RFID tags that are attached to tools can also be stored in memory. Stored data can also include any data associated with the computing system 220 (including any components thereof), any measurements taken by sensors, time measured by a timer, adjustments to an algorithm, threshold values, user preferences, default values, results of previously collected or analyzed data, and/or any other suitable data. The tracking manager software application 246 as well as other algorithms stored in memory 240 can comprise computer-executable instructions for performing a variety of methods, including the methods illustrated in FIG. 3. The tracking manager software application 246 and other algorithms can also execute computer-readable instructions based on information received via the communications interface 230, from data entered by a user via the input/output interface 235, or based on static variables that are programmed into the computing system 220.

The one or more processors 225 include a hardware processor that can be an integrated circuit, a central processing unit, a multi-core processing chip, an SoC, a multi-chip module including multiple multi-core processing chips, or other hardware processor in one or more example embodiments. The processor 225 is known by other names, including but not limited to a computer processor, a microprocessor, and a multi-core processor. In alternate embodiments, the one or more hardware processors can be replaced by other logic devices such as one or more field programmable gate arrays (FPGAs). Using FPGAs and/or other similar devices known in the art allows the computing system 220 (or portions thereof) to be programmable and function according to certain logic rules and thresholds without the use of a hardware processor.

The one or more I/O interfaces 235, such as a keyboard, display, or touch screen interface, allow a user to enter commands and information to the computing system 220, and also allow information to be presented to the user and/or other components or devices.

Also shown in FIG. 2 are two example tools, a hammer 260 and a wrench 270. The tools are examples of the types of tools a worker might bring up onto a rig, but it should be understood that other types of tools and objects can also be tracked and many more tools and objects can be tracked using computing system 220. The hammer 260 includes an RFID tag 161 and the wrench 270 includes an RFID tag 271. The RFID tags can be attached to an outer portion of the tool or may be attached to an inner portion of the tool where they are less obtrusive. The RFID tags can be passive RFID tags that include an integrated circuit and antenna that respond to an interrogation signal. Alternatively, the RFID tags can be active RFID tags that include an integrated circuit, an antenna, and a power source that enables the active RFID tag to emit an RF signal without being prompted by an interrogation signal. As illustrated in FIG. 2, the transceiver 250 can communicate with the RFID tags attached to the tools using radio frequency signals so that the computing system 220 can track the tools.

Referring to FIG. 3, example method 300 for operating the computing system 220 is illustrated. Although referred to in the singular, method 300 embodies multiple alternative methods as will be described further. It should be understood that many of the steps illustrated in method 300 are performed by or initiated by computer-executable instructions stored in memory 240. Such computer-executable instructions can be generally referred to as the tracking manager software application 246, but it should be understood that the computer-executable instructions can be organized in one or many software modules.

Referring to step 310, before the computer system 220 can be used to track tools, RFID tags must be applied to the tools. A unique tool name or tool identifier is stored in the circuit of the RFID tag so that each tool is uniquely identified. In step 315, the transceiver 250 is coupled with the computing system 220. For example, if the computing device is a smart phone that does not have a dedicated transceiver that communicates at the frequency used by the RFID tags, an external transceiver will need to be coupled to the smart phone. Alternatively, step 315 can be omitted if the computing device has a dedicated transceiver for communicating with the RFID tags.

Before a worker ascends the rig with tools, the worker will complete a registration process for the tools so that they can be tracked. In step 320, the tracking manager software application 246 can trigger the transceiver 250 to send an initial registration signal to the RFID tag 261 of a tool 260. The initial registration signal will trigger the RFID tag 261 on the tool 260 to respond and transceiver 250 receives a registration response signal from the RFID tag 261 in step 325. The registration response comprises a tool identifier for the tool 260 and, in step 330, the tracking manager software application 246 executing on the computing system can store the tool identifier in a registered tools file. If the worker has additional tools to be registered at step 335, the process of steps 320-330 can be repeated until all of the worker's tools are registered. In step 340, the tracking manager software application 246 can display on display screen 235 a name or other identifier for each of the tools that have been registered. The worker can review the list of registered tools to ensure that all of the tools the worker intends to bring up into the rig have been registered for tracking.

Once the worker ascends the rig, the computing system 220 can perform the tracking functions to ensure the worker does not leave behind a tool on the rig. In the case of passive RFID tags attached to the tools, in step 345, the tracking manager software application 246 prompts the transceiver 250 to send periodic interrogation signals to the RFID tags. The frequency of the periodic interrogation signals can be predetermined or can be selected in the tracking manager software application 246. As non-limiting examples, the frequency of the periodic interrogation signals can be every second for real-time tracking, every few seconds for near real-time tracking, every thirty seconds, or every two minutes. and the tracking manager software application evaluates the type of the status response signal received from the RFID tag attached to the tool.

The RFID tags will respond with a status response signal that is received at the transceiver 250 and the tracking manager software application 246, in step 355, evaluates the type of the status response signal. As one example, the tracking manager software application 246 can compare the status response signal against the list of registered tools 244 stored in memory 240 to confirm that the RFID tag attached to each tool has provided a response. As another example, one type of status response signal is the absence of a status response signal indicating that a tool's RFID tag failed to respond and may be out of range. As yet another example, the tracking manager software application 246 can analyze the strength of the status response signal for an RFID tag. If the strength of the status response signals from an RFID tag diminishes over time, it may be an indication that the worker has misplaced the tool and is gradually moving away from the tool. In step 360, if the tracking manager software application 246 determines that a tool has been misplaced, the tracking manager software application 246 can provide an alert to the worker. For example, the alert can be an audible alert emitted by a speaker 235 of the computing system 220. In addition, or alternatively, the alert can be displayed on the display 235 of the computing system 220. In another embodiment, if the tracking manager software application 246 determines that the tool is within a predetermined perimeter of the computing system 220, based on the receipt of the status response signal or the strength of the status response signal, the tracking manager software application 246 can provide an indication that the tool is accounted for or is secured.

If the RFID tags attached to the tools are active RFID tags, instead of passive RFID tags, method 300 can follow an alternate embodiment. In such an alternate embodiment, step 345 can be omitted because the active RFID tags have their own power source and do not require an interrogation signal in order to generate a response. In the alternate embodiment, when the worker ascends the rig with tools, such as the hammer 260 and wrench 270, the active RFID tags attached to the tools will emit periodic status signals that are detected by the transceiver 250. The periodic status signals can include a unique identifier for each tool. As with the previously described passive RFID embodiment, the frequency of the periodic status signals can be determined when the active RFID tags are initialized and can vary from a second to a few minutes. In step 350, the transceiver 250 provides the detected periodic status signals from the tools to the tracking manager software application 246. Steps 355 and 360 are performed in the same manner as described previously for the passive RFID tag example. If the tracking manager software application 246 determines that a tool is missing or beyond a predetermined perimeter from the computing system 220, the computing system 220 can generate an alert. Alternatively, if the computing system 220 determines that the tool is accounted for, it an provide such an indication.

Figure 4:
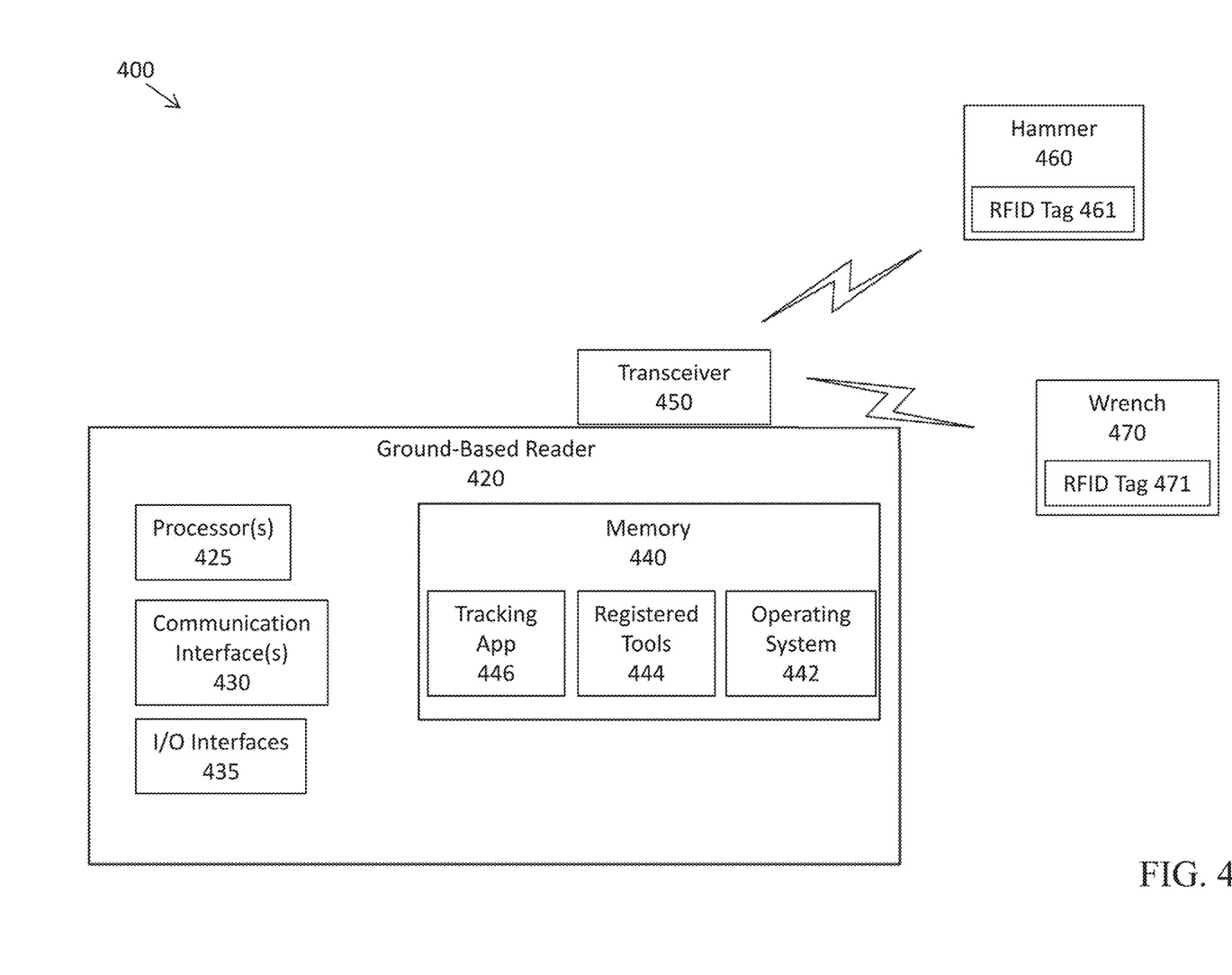
FIG. 4 is a schematic view of a system for tracking objects in accordance with another example embodiment of the present disclosure.
Figure 5:
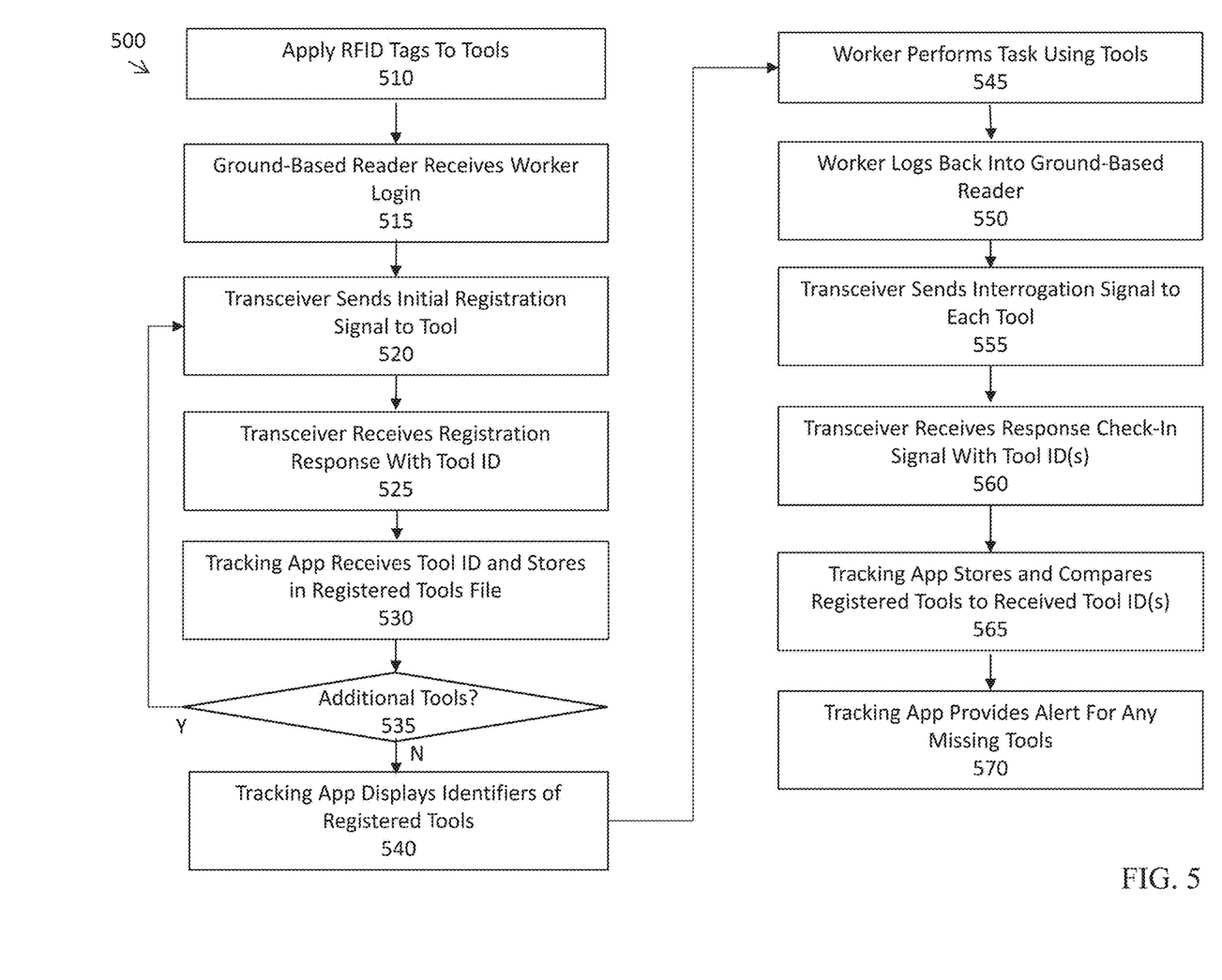
FIG. 5 illustrates a method for tracking objects using the system of FIG. 4 in accordance with an example embodiment of the present disclosure.

Referring now to FIGS. 4 and 5, another example embodiment for tracking objects or tools is illustrated. The example system 400 illustrated in FIG. 4 includes a computing system in the form of a ground-based reader 420 that is used to track tools. The computing system 420 can be disposed on a truck, vehicle, trailer or other equipment located at or near the base of the rig so that it is in a convenient location for tracking tools used on the rig. The tools can be scanned at the ground-based reader during a registration step before the worker ascends the rig and can be scanned again during a check-in step when the worker returns from the rig. The computing system 420 includes one or more processors 425, communications interface(s) 430, input/output interfaces 435, and memory 440. The memory 440 can comprise a tracking manager software application 446, data in the form of tool identifiers 444 associated with registered tools being tracked, an operating system 442, as well as other algorithms and data typically used in a computing system. The components of computing system 420 are substantially similar to the components in computing system 220, except that in the example system 400, the computing system 420 is a ground-based system that remains at or near the base of the rig or a vehicle used to service the rig. Accordingly, the previous detailed description of the components of computing system 220 of FIG. 2 applies to the similar components of computing system 420 and will not be repeated.

The computing system 420 of system 400 also comprises a transceiver 450 that is similar to the previously-described transceiver 250. The transceiver 450 communicates with RFID tags using radio frequency communications. The example system 400 shows two example tools, a hammer 460 and a wrench 470. The hammer 460 includes RFID tag 461 and the wrench 470 includes RFID tag 471. As described in connection with example system 200, the RFID tags can be located on an outer portion of the tools or in a less obtrusive inner portion of the tools. The transceiver 450 can communicate with RFID tags in order to track the location of the tools. In the ground-based registration and check-in approach of system 400 and method 500, the RFID tags are preferably passive RFID tags because there is no need for active RFID tags that emit signals using a power source. However, active RFID tags are not precluded from use in the embodiment of FIGS. 4 and 5.

Referring to FIG. 5, example method 500 for operating the computing system 420 is illustrated. Although referred to in the singular, method 500 can embody multiple alternative methods as will be described further. It should be understood that many of the steps illustrated in method 500 are performed by or initiated by computer-executable instructions stored in memory 440. Such computer-executable instructions can be generally referred to as the tracking manager software application 446, but it should be understood that the computer-executable instructions can be organized in one or many software modules.

In step 510, RFID tags are applied to tools 460 and 470. In step 515, the ground-based reader computing device 420 receives a login from a worker who is registering tools in preparation to ascend a rig. The tracking manager software application 446 can trigger the transceiver 450 to send an initial registration signal to the RFID tag 461 of a tool 460 in step 520. The initial registration signal will trigger the RFID tag 461 on the tool 460 to respond and transceiver 450 receives a registration response signal containing a tool identifier from the RFID tag 461 in step 525. In step 530, the tracking manager software application 446 executing on the computing system (ground-based reader 420) can store the tool identifier in a registered tools file 444. If the worker has additional tools to be registered at step 535, the process of steps 520-530 can be repeated until all of the worker's tools are registered. In step 540, the tracking manager software application 446 can display on display screen 435 a name or other identifier for each of the tools that have been registered. The worker can review the list of registered tools to ensure that all of the tools the worker intends to bring up into the rig have been registered for tracking.

Once the tools are registered, the worker ascends the rig and performs work using the tools in step 545. After the worker completes the work on the rig, the worker returns to the ground-based reader 420 to check in the tools to ensure none have been left on the rig. In step 550, the worker logs back into the ground-based reader so that the reader can retrieve the list of tools the worker previously registered. In step 555, the tracking manager software application 446 prompts the transceiver 450 to send an interrogation signal to the RFID tags on each tool.

The RFID tags will respond with a response check-in signal that includes the tool identifiers and that is received at the transceiver 450 in step 560. The tracking manager software application 446, in step 565, stores the received response check-in signals and compares them to the tool identifiers stored during the initial registration step. If the tracking manager software application 446 determines that a response check-in signal has not been received for any of the registered tool identifiers, in step 570, the tracking manager software 446 can generate an alert via the ground-based reader indicating a tool is missing and may have been left on the rig. The alert can be an audible alert generated by a speaker 435 and/or a visual alert on a display 435. In another embodiment, if the tracking manager software application 446 determines that all of the tools are accounted for, the application can generate a report confirming all of the tools have been returned from the rig.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Referring generally to the examples herein, the computing systems can comprise a single integrated system or a combination of components or modules that are coupled together. Regarding the RFID tags, they can consist of an integrated circuit with a power source or they can be assembled as a combination of components.

Terms such as "first", "second", "top", "bottom", "side", "distal", "proximal", and "within" are used merely to distinguish one component (or part of a component or state of a component) from another. Such terms are not meant to denote a preference or a particular orientation and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A computing system comprising:
    a display;
    a transceiver;
    a memory, the memory comprising computer-readable instructions; and
    one or more processors configured to execute the computer-readable instructions to:
        transmit, by the transceiver, an initial registration signal to a tool, the tool comprising a radio frequency tag;
        receive, by the transceiver, a registration response signal from the radio frequency tag of the tool, the registration response signal comprising a tool identifier;
        store, by a tracking manager, the tool identifier in a registered tools file;
        display, by the tracking manager, the tool identifier on the display;
        transmit, by the transceiver, an interrogation signal to the radio frequency tag of the tool after a predetermined time interval; and
        evaluate, by the tracking manager, a strength of a periodic status response signal from the radio frequency tag of the tool,
        wherein, if the tracking manager determines based on the strength of the periodic status response signal that the tool is beyond a perimeter distance from the computing system, the tracking manager provides an alert via the computing system.

2. The computing system of claim 1, wherein the computing system is a smart phone and the transceiver is a radio frequency transceiver that attaches to the smart phone.

3. The computing system of claim 1, wherein the tool identifier comprises at least one of a tool name and a tool serial number.

4. The computing system of claim 1, wherein the alert comprises at least one of:
    an audible alert emitted from the computing system, and
    a visible alert displayed on the display of the computing system.

5. The computing system of claim 1, wherein the one or more processors are further configured to execute the computer-readable instructions to:
    determine, by the tracking manager, that the strength of the periodic status response signal from the radio frequency tag of the tool fails to meet a threshold signal strength;
    in response to determining the strength of the periodic status response signal from the radio frequency tag of the tool fails to meet the threshold signal strength, determine, by the tracking manager, that the tool is beyond the perimeter distance from the computing system; and
    provide, by the tracking manager, the alert from the computing system.

6. The computing system of claim 1, wherein the one or more processors are further configured to execute the computer-readable instructions to:
    determine, by the tracking manager, that the strength of the periodic status response signal from the radio frequency tag of the tool meets a threshold signal strength;
    in response to determining the strength of the periodic status response signal from the radio frequency tag of the tool meets the threshold signal strength, determine, by the tracking manager, that the tool is within the perimeter distance from the computing system; and
    provide, by the tracking manager, a notification via the computing system indicating the tool is secured.

7. A computing system comprising:
    a display;
    a transceiver;
    a memory, the memory comprising computer-readable instructions; and
    one or more processors configured to execute the computer-readable instructions to:
        transmit, by the transceiver, an initial registration signal to a tool, the tool comprising a radio frequency tag, wherein the initial registration signal causes the radio frequency tag of the tool to change from an inactive state to an active state;
        receive, by the transceiver, a registration response signal from the radio frequency tag of the tool, the registration response signal comprising a tool identifier;
        store, by a tracking manager, the tool identifier in a registered tools file;
        display, by the tracking manager, the tool identifier on the display;
        receive, by the transceiver, a periodic status signal from the radio frequency tag of the tool; and
        evaluate, by the tracking manager, a strength of the periodic status signal from the radio frequency tag of the tool,
        wherein, if the tracking manager determines based on the strength of the periodic status signal that the tool is beyond a perimeter distance from the computing system, the tracking manager provides an alert via the computing system.

8. The computing system of claim 7, wherein the radio frequency tag comprises an antenna, an integrated circuit, and a power source.

9. The computing system of claim 7, wherein the active state of the radio frequency tag causes the radio frequency tag to emit the periodic status signal.

10. The computing system of claim 7, wherein the one or more processors are further configured to execute the computer-readable instructions to:
    store, by the tracking manager in memory, the strength of the periodic status signal for a plurality of periodic status signals;
    evaluate, by the tracking manager, a change in strength of the plurality of periodic status signals over time; and
    provide a second alert, by the tracking manager via the computing system, in response to the change in strength of the plurality of periodic status signals over time exceeding a threshold value.

11. The computing system of claim 7, wherein the one or more processors are further configured to execute the computer-readable instructions to:

determine, by the tracking manager, that the strength of the periodic status signal from the radio frequency tag of the tool meets a threshold signal strength;

in response to determining the strength of the periodic status signal from the radio frequency tag of the tool meets the threshold signal strength, determine, by the tracking manager, that the tool is within the perimeter distance from the computing system; and provide, by the tracking manager, a notification via the computing system indicating the tool is secured.

12. The computing system of claim 7, wherein the computing system is a smart phone and the transceiver is a radio frequency transponder that attaches to the smart phone.

13. The computing system of claim 7, wherein the tool identifier comprises at least one of a tool name and a tool serial number.

14. The computing system of claim 7, wherein the alert comprises at least one of:

an audible alert emitted from the computing system, and a visible alert displayed on the display of the computing system.

* * * * *